(12) United States Patent
Park et al.

(10) Patent No.: US 11,257,189 B2
(45) Date of Patent: Feb. 22, 2022

(54) ELECTRONIC APPARATUS AND IMAGE PROCESSING METHOD THEREOF

(71) Applicant: SAMSUNG ELECTRONICS CO., LTD., Suwon-si (KR)

(72) Inventors: Seungho Park, Suwon-si (KR); Youngsu Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 16/734,001

(22) Filed: Jan. 3, 2020

(65) Prior Publication Data
US 2020/0349675 A1 Nov. 5, 2020

(30) Foreign Application Priority Data

May 2, 2019 (KR) .................. 10-2019-0051386
Jun. 28, 2019 (KR) .................. 10-2019-0078248

(51) Int. Cl.
*G06K 9/62* (2006.01)
*G06T 5/00* (2006.01)
*G06T 5/50* (2006.01)

(52) U.S. Cl.
CPC .............. *G06T 5/002* (2013.01); *G06T 5/50* (2013.01); *G06T 2207/20081* (2013.01); *G06T 2207/20084* (2013.01); *G06T 2207/20208* (2013.01)

(58) Field of Classification Search
CPC ........ B60N 2205/40; B60N 2/12; B60N 2/20; B60N 2/206; B60N 2/22; B60N 2/2352;
(Continued)

(56) References Cited

U.S. PATENT DOCUMENTS 6,633,342 B2 10/2003 Kim
7,538,822 B2 5/2009 Lee et al.
(Continued)

FOREIGN PATENT DOCUMENTS

CN 108416748 A 8/2018
CN 108885784 A 11/2018
(Continued)

OTHER PUBLICATIONS

Written Opinion (PCT/ISA/237) issued by the International Searching Authority in corresponding International Application No. PCT/KR2019/014896, dated Mar. 3, 2020.
(Continued)

*Primary Examiner* — Xin Jia
(74) *Attorney, Agent, or Firm* — Sughrue Mion, PLLC

(57) ABSTRACT

An electronic apparatus is disclosed. The electronic apparatus includes a memory storing at least one instruction, and a processor, electrically connected to the memory, configured to, by executing the instruction, obtain, from an input image, a noise map corresponding to the input image; provide the input image to an input layer of a learning network model including a plurality of layers, the learning network model being an artificial intelligence (AI) model that is obtained by learning, through an AI algorithm, a relationship between a plurality of sample images, a respective noise map of each of the plurality of sample images, and an original image corresponding to the plurality of sample images; provide the noise map to at least one intermediate layer among the plurality of layers; and obtain an output image based on a result from providing the input image and the noise map to the learning network model.

20 Claims, 17 Drawing Sheets

(58) Field of Classification Search
CPC .............. B60N 2/36; B60N 2/366; G06T 2207/10016; G06T 2207/20012; G06T 2207/20021; G06T 2207/20081; G06T 2207/20084; G06T 2207/20208; G06T 3/4046; G06T 5/002; G06T 5/50
See application file for complete search history.

(56) References Cited

U.S. PATENT DOCUMENTS

| | | |
|---|---|---|
| 7,609,908 B2 | 10/2009 | Luo et al. |
| 8,139,883 B2 | 3/2012 | Zhang et al. |
| 9,262,808 B2 | 2/2016 | Porikli et al. |
| 10,043,243 B2 | 8/2018 | Matviychuk et al. |
| 10,423,830 B2 | 9/2019 | Chalom et al. |
| 10,817,984 B2 | 10/2020 | Yu et al. |
| 2013/0335601 A1 | 12/2013 | Shiota et al. |
| 2014/0219552 A1 | 8/2014 | Porikli et al. |
| 2017/0308734 A1 | 10/2017 | Chalom et al. |
| 2018/0293762 A1 | 10/2018 | Fu et al. |
| 2018/0300850 A1 | 10/2018 | Johnson et al. |
| 2018/0322614 A1* | 11/2018 | Petrova ............... G06T 5/20 |
| 2018/0336662 A1 | 11/2018 | Kimura |
| 2018/0349759 A1 | 12/2018 | Isogawa et al. |
| 2019/0096038 A1 | 3/2019 | El-Khamy et al. |
| 2019/0114742 A1 | 4/2019 | Wang |
| 2019/0266703 A1 | 8/2019 | Yu et al. |
| 2019/0378248 A1 | 12/2019 | Ida et al. |
| 2019/0378270 A1* | 12/2019 | Ida .................. A61B 5/055 |
| 2020/0267339 A1* | 8/2020 | Douady-Pleven ... H04N 19/503 |
| 2021/0090238 A1* | 3/2021 | Gallagher-Gruber ................... G01N 15/0625 |

FOREIGN PATENT DOCUMENTS

| | | |
|---|---|---|
| CN | 109118490 A | 1/2019 |
| CN | 109360154 A | 2/2019 |
| CN | 109544476 A | 3/2019 |
| CN | 109658348 A | 4/2019 |
| EP | 3410392 A1 | 12/2018 |
| EP | 3 742 388 A1 | 11/2020 |
| JP | 08-255244 A | 10/1996 |
| JP | 3580947 B2 | 10/2004 |
| JP | 2006-031440 A | 2/2006 |
| JP | 2013-258596 A | 12/2013 |
| JP | 2014-154141 A | 8/2014 |
| JP | 2015-121884 A | 7/2015 |
| JP | 2018-195069 A | 12/2018 |
| JP | 2018-206382 A | 12/2018 |
| JP | 2019-208990 A | 12/2019 |
| JP | 2019-211391 A | 12/2019 |
| KR | 10-1853237 B1 | 4/2018 |
| KR | 10-2019-0035465 A | 4/2019 |

OTHER PUBLICATIONS

International Search Report (PCT/ISA/210), issued by International Searching Authority in corresponding International Application No. PCT/KR2019/014896, dated Mar. 3, 2020.

Matias Tassano et al. "An Analysis and Implementation of the FFDNet Image Denoising Method" IPOL, vol. 9, Jan. 6, 2019, (pp. 1-25) retrieved from https://doi.org/10.5201/ipol.2019.231.

Yoonsik Kim et al. "A Pseudo-Blind Convolutional Neural Network for the Reduction of Compression Artifacts" IEEE Transactions on circuits and systems for video technology, vol. 30, No. 4, Apr. 2020, (15 pages total).

Yoonsik Kim et al. "Adaptively Tuning a Convolutional Neural Network by Gate Process for Image Denoising" IEEE Access, vol. 7, May 17, 2019, (10 pages total).

Communication dated May 4, 2020, from the European Patent Office in counterpart European Application No. 19210761.3.

Office Action dated Jun. 30, 2020 by the Japanese Patent Office in counterpart Japanese Patent Application No. 2019-237838.

Kai Zhang et al. "FFDNet: Toward a Fast and Flexible Solution for CNN based Image Denoising" IEEE Transactions on Image Processing, May 22, 2018 (pp. 1-15).

Kai Zhang et al. "Beyond a Gaussian Denoiser: Residual Learning of Deep CNN for Image Denoising" IEEE Transactions on Image Processing, vol. 26, No. 7, Aug. 13, 2016 (pp. 1-13).

Yulun Zhang et al. "Residual Dense Network for Image Restoration" Journal of Latex Class Files, vol. 13, No. 9, Sep. 2014 (pp. 1-14).

Communication dated Mar. 29, 2021, from The China National Intellectual Property Administration in Application No. 201911042783.9.

Communication dated Oct. 7, 2021 issued by the European Intellectual Property Office in counterpart European Application No. 19 210 761.3.

\* cited by examiner

FIG. 9A

| Dataset | Q | JPEG image CAR - Specific | | JPEG image CAR - Blind | | | | |
|---|---|---|---|---|---|---|---|---|
| | | TNRD[5] PSNR/SSIM | RDN[15] PSNR/SSIM | DnCNN-3[6] PSNR/SSIM | DnCNN PSNR/SSIM | QEDnCNN PSNR/SSIM | RDN PSNR/SSIM | QERDN PSNR/SSIM |
| LIVE1 | 10 | 29.15 / 0.8111 | 29.70 / 0.8252 | 29.19 / 0.8123 | 29.15 / 0.8117 | 29.26 / 0.8141 | 29.33 / 0.8163 | 29.35 / 0.8162 |
| | 20 | 31.46 / 0.8769 | 32.10 / 0.8886 | 31.59 / 0.8802 | 31.55 / 0.8788 | 31.65 / 0.8810 | 31.70 / 0.8821 | 31.72 / 0.8824 |
| | 30 | 32.84 / 0.9059 | 33.54 / 0.9156 | 32.98 / 0.9090 | 32.96 / 0.9080 | 33.07 / 0.9098 | 33.11 / 0.9105 | 33.13 / 0.9107 |
| | 40 | - | 34.54 / 0.9304 | 33.96 / 0.9247 | 33.95 / 0.9241 | 34.06 / 0.9255 | 34.10 / 0.9260 | 34.12 / 0.9262 |
| | 50 | - | - | 34.77 / 0.9356 | 34.77 / 0.9352 | 34.89 / 0.9365 | 34.91 / 0.9368 | 34.94 / 0.9370 |
| | 60 | - | - | 35.57 / 0.9447 | 35.59 / 0.9445 | 35.72 / 0.9458 | 35.74 / 0.9459 | 35.77 / 0.9462 |
| | 70 | - | - | 36.67 / 0.9550 | 36.70 / 0.9550 | 36.84 / 0.9560 | 36.85 / 0.9561 | 36.90 / 0.9564 |
| | 80 | - | - | 38.29 / 0.9666 | 38.35 / 0.9666 | 38.50 / 0.9675 | 38.50 / 0.9676 | 38.56 / 0.9677 |
| | 90 | - | - | 41.38 / 0.9810 | 41.44 / 0.9810 | 41.69 / 0.9816 | 41.65 / 0.9817 | 41.75 / 0.9818 |
| Classic5 | 10 | 29.28 / 0.7992 | 30.00 / 0.8194 | 29.40 / 0.8026 | 29.30 / 0.8004 | 29.40 / 0.8039 | 29.60 / 0.8085 | 29.59 / 0.8079 |
| | 20 | 31.47 / 0.8576 | 32.15 / 0.8704 | 31.63 / 0.8610 | 31.62 / 0.8598 | 31.70 / 0.8619 | 31.80 / 0.8637 | 31.81 / 0.8640 |
| | 30 | 32.78 / 0.8837 | 33.43 / 0.8932 | 32.91 / 0.8861 | 32.92 / 0.8855 | 33.00 / 0.8872 | 33.09 / 0.8883 | 33.09 / 0.8884 |
| | 40 | - | 34.27 / 0.9063 | 33.77 / 0.9003 | 33.79 / 0.9001 | 33.86 / 0.9013 | 33.94 / 0.9022 | 33.95 / 0.9024 |
| | 50 | - | - | 34.45 / 0.9107 | 34.49 / 0.9108 | 34.57 / 0.9118 | 34.62 / 0.9124 | 34.64 / 0.9127 |
| | 60 | - | - | 35.11 / 0.9196 | 35.15 / 0.9199 | 35.23 / 0.9208 | 35.27 / 0.9211 | 35.30 / 0.9216 |
| | 70 | - | - | 35.97 / 0.9300 | 36.04 / 0.9304 | 36.13 / 0.9312 | 36.14 / 0.9313 | 36.20 / 0.9319 |
| | 80 | - | - | 37.09 / 0.9422 | 37.28 / 0.9433 | 37.40 / 0.9440 | 37.35 / 0.9439 | 37.44 / 0.9444 |
| | 90 | - | - | 38.54 / 0.9512 | 39.88 / 0.9654 | 40.07 / 0.9657 | 39.94 / 0.9656 | 40.09 / 0.9660 |

ELECTRONIC APPARATUS AND IMAGE PROCESSING METHOD THEREOF

CROSS-REFERENCE TO RELATED APPLICATION

This application is based on and claims priority under 35 U.S.C. § 119 from Korean Patent Application Nos. 10-2019-0078248, filed on Jun. 28, 2019, and 10-2019-0051386, filed on May 2, 2019, in the Korean Intellectual Property Office, the disclosures of which are incorporated by reference herein in its entirety.

BACKGROUND

Field

The disclosure relates to an electronic apparatus and an image processing method thereof. More particularly, the disclosure relates to an electronic apparatus which obtains an output image in which quality of an input data is improved, and an image processing method thereof.

The disclosure relates to an artificial intelligence (AI) system which simulates a function of the human brain, such as recognition, determination, or the like, using machine learning algorithm, and an application thereof.

Description of Related Art

In recent years, artificial intelligence (AI) systems that implement human-level intelligence have been used in various fields. AI system is a system in which the machine learns, determines and becomes intelligent, unlike the existing rule-based smart system. The more the AI systems are used, the more the recognition rate is improved, and a preference of a user can be understood more accurately and thus, existing rule-based smart systems are gradually being replaced by deep learning-based AI systems.

The AI technology is composed of machine learning (for example, deep learning) and element technologies which utilize machine learning.

Machine learning is an algorithm technology that classifies/learns the characteristics of input data by itself. Element technology is a technology that simulates functions such as recognition and determination of human brain using machine learning algorithms such as deep learning, composed of linguistic understanding, visual understanding, reasoning/prediction, knowledge representation, motion control, etc.

This AI technology may be used for various and complex types of de-noising. In particular, in the case of streaming a video, visually unpleasant artifacts such as block edges and ringing artifacts are generated in the process compression to a low bit rate and thus, compression artifacts reduction (CAR) is important.

For de-noising, an image degradation model $y=x+e$ is generally used. Here, y is an observed image with noise having a clean image x and noise e. A number of image de-noising studies estimate x using an image estimation model including a non-local self-similarity (NSS) model and a sparse model. A representative method of using the NSS model is block-matching and 3D filtering (BM3D) or wavelet neural network (WNN), but there is a limitation to achieve high de-noising performance.

Recently, in order to address the limitation, a discriminative learning method has been developed. Although a trainable nonlinear reaction diffusion (TNRD) that provides better performance compared to the NSS model such as the BM3D has been proposed, it may be a disadvantage that the TNRD is trained only for a particular artifacts model.

In addition, de-noising convolutional neutral network (DnCNN) adopting the residual learning strategy and batch normalization has been proposed, but there is a disadvantage in that a separate convolutional neutral network (CNN) for image quality evaluation is not present.

Also, a fast and flexible de-noising convolutional neural network (FFDNet) has been proposed to remove spatially varying noise using an uneven noise level map as an input. However, since FFDNet is assumed to be given a noise map and the noise map is used only once for the first layer, there is a limitation that another layer of the FFDNet may not fully utilize the noise map.

In the case of a residual dense network (RDN) for single image super-resolution (SISR), there is an advantage that all the hierarchical features with residual high-density blocks may be used completely. However, there is a limitation in that only a specific model suitable for each artifacts level has been learned.

Accordingly, there is a necessity to develop a method for adaptively de-noising spatially varying artifacts in an input image.

SUMMARY

Various example embodiments of the disclosure address the above disadvantages and other disadvantages not described above.

According to an aspect of the disclosure, there is to provide an electronic apparatus which adaptively improves quality according to an input image and an image processing method thereof.

According to an aspect of the disclosure, there is provided an electronic apparatus comprising: a memory storing one or more instructions; and a processor, electrically connected to the memory, and configured to execute the one or more instructions to: obtain, from an input image, a noise map corresponding to the input image; provide the input image to an input layer of a learning network model including a plurality of layers, the learning network model being an artificial intelligence (AI) model that is obtained by learning, through an AI algorithm, a relationship between a plurality of sample images, a respective noise map of each of the plurality of sample images, and an original image corresponding to the plurality of sample images; provide the noise map to at least one intermediate layer among the plurality of layers; and obtain an output image based on a result from providing the input image and the noise map to the learning network model.

The learning network model may further comprise at least one sub-layer, and the processor may be further configured to process the noise map using the at least one sub-layer, and provide the processed noise map to the at least one intermediate layer.

The processor may be further configured to provide a plurality of channels corresponding to output data that is output from a previous layer of each of the at least one intermediate layer and an additional channel to each of the at least one intermediate layer, and the additional channel may be the processed noise map that is output from a sub-layer, among the at least one sub-layer, corresponding to each of the at least one intermediate layer.

The processor may be further configured to obtain the output image by mixing the input image and output data of an output layer among the plurality of layers.

The processor may be further configured to obtain the noise map by providing the input image to a noise map generation model including a plurality of layers, and the noise map generation model may be an AI model that is obtained by learning, through an AI algorithm, a relationship between the plurality of sample images and a respective noise map of each of the plurality of sample images.

The processor may be further configured to provide the noise map to each of the plurality of layers or provide the noise map to each of remaining layers except the input layer among the plurality of layers.

The learning network model may be an AI model obtained by learning, through the AI algorithm, a relationship between an output image that is obtained by sequentially processing, by the plurality of layers, each of the plurality of sample images provided to an input layer, among the plurality of layers, and a respective noise map of each of the plurality of sample images provided to the at least one intermediate layer and an original image corresponding to each of the plurality of sample images.

Each of the plurality of sample images may be a compression image in which an original image is compressed, and the noise map for the respective sample images may be a noise map obtained from the respective sample images and an original image corresponding to the respective sample images.

The processor may be further configured to obtain an output video in which a feature of the video is adjusted, by providing each of a plurality of frames included in the video to the learning network model as the input image.

The electronic apparatus may further comprise a display, the processor may be further configured to: convert a resolution of the output image based on the resolution of the display and control the display to display the output image with converted resolution, and the output image with converted resolution may be a 4K ultra high definition (UHD) image or an 8K UHD image.

The processor may be further configured to: obtain an object region from the input image; adjust a feature of the object region by providing information on the object region to the learning network model, and obtain the output image based on the feature of the object region adjusted.

The processor may be further configured to: obtain a background region from the input image, adjust a feature of the background region by providing information on the background region to the learning network model, and obtain the output image based on the feature of the background region adjusted.

The learning network model may be a model for upscaling a resolution of an image.

The learning network model may be a model for de-noising an image.

The processor may be further configured to: obtain an object region and a background region from the input image, and obtain the output image in which a feature of the input image is adjusted by providing at least one of information on the object region or information on the background region to the learning network model.

According to an aspect of the disclosure, there is provided an image processing method of an electronic apparatus, the method comprising: obtaining, from an input image, a noise map corresponding to the input image; providing an input image to an input layer among a plurality of layers included in a learning network model, the learning network model being an artificial intelligence (AI) model that is obtained by learning, through an AI algorithm, a relationship between a plurality of sample images, a respective noise map of each of the plurality of sample images, and an original image corresponding to the plurality of sample images; providing the noise map to at least one intermediate layer among the plurality of layers; and obtaining an output image based on a result from providing the input image and the noise map to the learning network model.

The method may further comprises processing the noise map using at least one sub-layer of the learning network model; and providing the processed noise map to the at least one intermediate layer.

The providing the noise map to at least one intermediate layer may comprise providing a plurality of channels corresponding to output data that is output from a previous layer of each of the at least one intermediate layer and an additional channel to each of the at least one intermediate layer, and the additional channel may be the processed noise map that is output from a sub-layer, among the at least one sub-layer, corresponding to each of the at least one intermediate layer.

The obtaining the output image may comprise obtaining the output image by mixing the input image and output data of an output layer among the plurality of layers.

The obtaining the noise map may comprise obtaining the noise map by applying the input image to a noise map generation model including a plurality of layers, and the noise map generation model may be an AI model that is obtained by learning, through an AI algorithm, a relationship between the plurality of sample images and a respective noise map of each of the plurality of sample images.

The providing may comprise providing the noise map to each of the plurality of layers or providing the noise map to each of remaining layers except the input layer among the plurality of layers.

The learning network model may be an AI model obtained by learning, through the AI algorithm, a relationship between an output image that is obtained by sequentially processing, by the plurality of layers, each of the plurality of sample images provided to an input layer, among the plurality of layers, and a respective noise map of each of the plurality of sample images provided to the at least one intermediate layer and an original image corresponding to each of the plurality of sample images.

The method may further comprise obtaining an object region from the input image, adjusting a feature of the object region by providing information on the object region to the learning network model, and obtaining the output image based on the feature of the object region adjusted.

The method may further comprise obtaining a background region from the input image, adjusting a feature of the background region by applying information on the background region to the learning network model, and obtaining the output image based on the feature of the background region adjusted.

The learning network model may be a model for upscaling a resolution of an image.

The learning network model may be a model for de-noising an image.

The method may further comprise obtaining an object region and a background region from the input image, and obtaining the output image in which a feature of the input image is adjusted by applying at least one of information on the object region or information on the background region to the learning network model.

According to another aspect of the disclosure, there is provided an electronic apparatus comprising: a memory storing one or more instructions; and a processor, electrically connected to the memory, and configured to execute the one or more instructions to: obtain a first region from an input image, adjust a feature in the first region of the input image based on a relationship between information about the first region and at least one of a plurality of candidate images; and obtain an output image based on the adjusted first region and the input image.

The plurality of candidate images are obtained by providing one or more original images to a learning network model, the learning network model being an artificial intelligence (AI) model that is obtained by learning, through an AI algorithm, a relationship between a plurality of sample images corresponding to the one or more original images, a respective noise map of each of the plurality of sample images, and the one or more original images.

The adjusting the feature in the first region of the input image may comprise upscaling the resolution of the first region of the input image.

The plurality of candidate images may be obtained based on an original image and an upscaled image, which is obtained after lowering the resolution of the original image.

The adjusting the feature in the first region of the input image may comprise de-noising the first region of the input image.

The plurality of candidate images are obtained based on an original image and a noisy image, which is obtained after adding noise to the original image.

According to another aspect of the disclosure, there is provided an electronic apparatus comprising: a memory storing one or more instructions; and a processor, electrically connected to the memory, and configured to execute the one or more instructions to: obtain a first object from an input image, the first object being different from a second object in the input image, individually adjust a feature in the first object of the input image by processing the first object separate from the second object in the input image; and obtain an output image based on the adjusted first object and the input image.

The processing the first object may comprise processing the first object based on a learning network model, the learning network model being an artificial intelligence (AI) model that is obtained by learning, through an AI algorithm, a relationship between a plurality of sample images corresponding to one or more original images, a respective noise map of each of the plurality of sample images, and the one or more original images.

The adjusting the feature in the first object of the input image may comprise adjusting the resolution of the first object of the input image based on a relationship between information about the first object and at least one of a plurality of candidate images obtained by training the learning network model.

The plurality of candidate images may be obtained based on an original image and an upscaled image, which is obtained after lowering the resolution of the original image.

The adjusting the feature in the first object of the input image may comprise de-noising the first object of the input image based on a relationship between information about the first object and at least one of a plurality of candidate images by training the learning network model.

The plurality of candidate images may be obtained based on an original image and a noisy image, which is obtained after adding noise to the original image.

According to various embodiments, an electronic apparatus may improve quality of an input image by identifying quality of an input image more accurately by obtaining a noise map from an input image and using a learning network model which adaptively operates based on the noise map.

BRIEF DESCRIPTION OF THE DRAWINGS

The above and/or other aspects, features, and advantages of certain embodiments of the disclosure will be more apparent from the following detailed description, taken in conjunction with the accompanying drawings, in which:

FIGS. 9A and 9B are views illustrating a performance of a learning network model to improve quality of an input image according to various embodiments;

DETAILED DESCRIPTION

Figure 1:
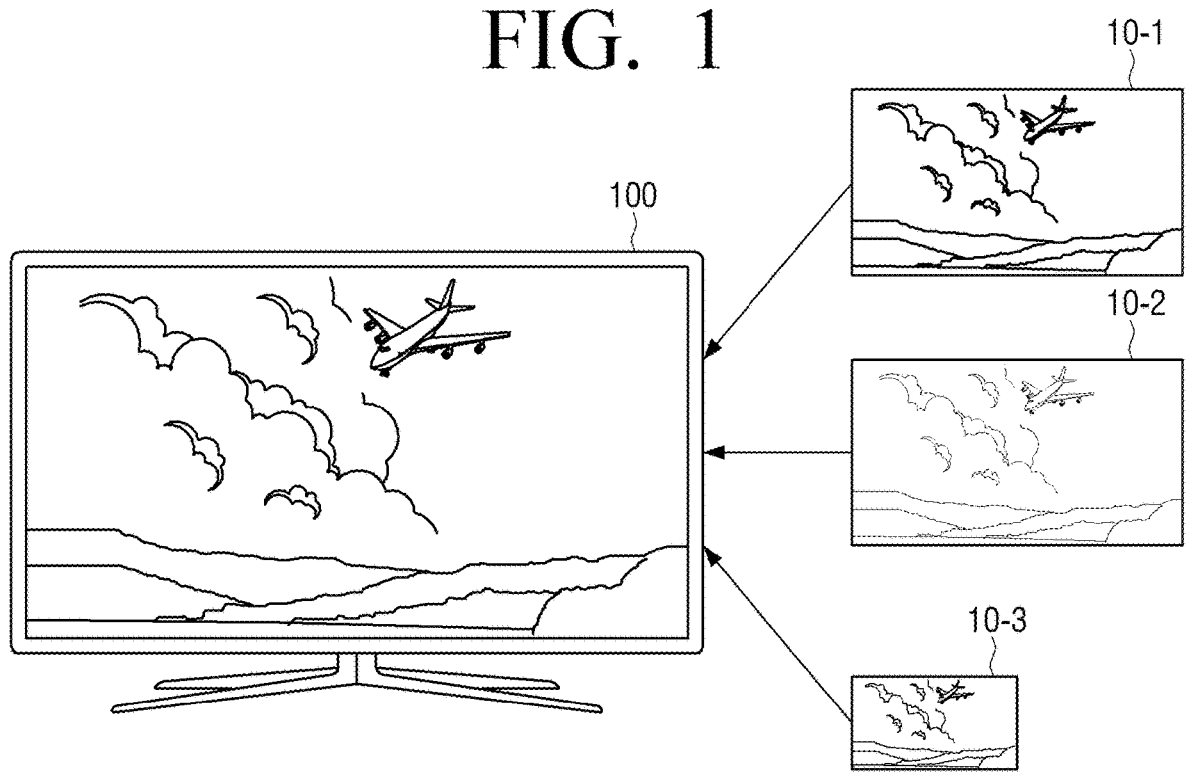
FIG. 1 is a diagram illustrating an electronic apparatus according to an embodiment.

One or more specific embodiments of the disclosure are illustrated in the drawings and are described in detail in the detailed description. However, it is to be understood that the disclosure is not limited to the one or more specific embodiments, but includes all modifications, equivalents, and substitutions without departing from the scope and spirit of the present disclosure. Also, well-known functions or constructions are not described in detail since they would obscure the disclosure with unnecessary detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

In this specification, the expressions "have," "may have," "include," or "may include" or the like represent presence of a corresponding feature (for example: components such as numbers, functions, operations, or parts) and does not exclude the presence of additional feature.

The expression "At least one of A or/and B" should be understood to represent "A" or "B" or any one of "A and B".

As used herein, the terms "first," "second," or the like may denote various components, regardless of order and/or importance, and may be used to distinguish one component from another, and does not limit the components.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

In this disclosure, a term user may refer to a person using an electronic apparatus or an apparatus (for example: AI electronic apparatus) which uses an electronic apparatus.

Hereinafter, embodiments of the disclosure will be described in detail with reference to the accompanying drawings.

FIG. 1 is a view illustrating an example of an electronic apparatus 100 according to an embodiment.

The electronic apparatus 100, as illustrated in FIG. 1, may be implemented as a device having a display such as a TV, a monitor, a smart phone, a tablet PC, a notebook PC, a head mounted display (HMD), a near-eye display (NED), a large format display (LFD), a digital signage, a digital information display (DID), a video wall, a projector display, or the like, but is not limited thereto.

The electronic apparatus 100 may be an apparatus which provides an image to a device including an external display, such as a server, a Blu-ray disc (BD) player, a disc player, a streaming box, or the like.

The disclosure is not limited thereto, and according to another embodiment, the electronic apparatus 100 may be any device capable of image-processing an image.

The electronic apparatus 100 may receive various types of images. For example, the electronic apparatus 100 may receive at least one image among a standard definition (SD), high definition (HD), full HD, ultra HD images. Alternatively, the electronic apparatus 100 may receive an image in a compressed form such as a moving picture experts group (MPEG) (for example, MP2, MP4, MP7, etc.), advanced video coding (AVC), H.264, a high efficiency video codec (HEVC), or the like.

According to an embodiment, the electronic apparatus 100, as illustrated in FIG. 1, may receive an image 10-1 which has the same resolution as the display of the electronic apparatus 100 and is not compressed. In this case, the electronic apparatus 100 may display the image 10-1 without performing image processing operation on the received image 10-1. However, an image w quality as the image 10-1 may not received always received by the apparatus 100.

According to an embodiment, the electronic apparatus 100 may receive an image 10-2 having the same resolution as the display of the electronic apparatus 100 but having the image quality degraded due to compression. In this case, the electronic apparatus 100 needs to improve the quality of the degraded image 10-2.

According to an embodiment, the electronic apparatus 100 may receive an image 10-3 having a resolution lower than the resolution of the display of the electronic apparatus 100. In this case, upscaling operation on the image 10-3 may have to be performed, but the quality may be lowered. Accordingly, the electronic apparatus 100 needs to improve the quality of the image 10-3 before upscaling and then upscale the image with improved quality or improve the quality of the upscaled image.

According to another embodiment, the electronic apparatus 100 may receive various types of images, and needs to perform image improvement in consideration of a characteristic of each image. Hereinafter, a method of image quality improvement of the electronic apparatus 100 and various embodiments will be described.

Figure 2:
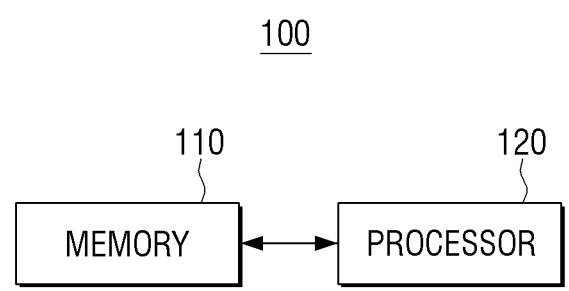
FIG. 2 is a block diagram illustrating a configuration of an electronic apparatus according to an embodiment.

FIG. 2 is a block diagram illustrating a configuration of the electronic apparatus 100 according to an embodiment. As illustrated in FIG. 2, the electronic apparatus 100 includes a memory 110 and a processor 120.

The memory 110 is electrically connected to the processor 120 and may store data necessary for various embodiments. In this case, the memory 110 may be implemented as an internal memory such as read only memory (for example, electrically erasable programmable read-only memory (EEPROM)), random-access memory (RAM), or the like, included in the processor 120, or a memory separate from the processor 120. In this case, the memory 110 may be implemented as a memory embedded with the electronic apparatus 100, or may be implemented as a detachable memory in the electronic apparatus 100, according to the data usage purpose. For example, data for driving the electronic apparatus 100 may be stored in a memory embedded in the electronic apparatus 100, and data for an expanded function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multimedia card (MMC), etc.), an external memory (for example, a USB memory) connectable to the USB port, or the like.

The memory 110 may store a learning network model used to improve the quality of the input image. Here, the learning network model may be a model of machine learning based on a plurality of sample images, a noise map for each sample image, and an original image corresponding to each sample image. For example, the learning network model may be a model that is learned using convolution neural network (CNN) for a plurality of sample images, a noise map for each sample image, and an original image corresponding to each sample image. Here, the CNN is a multi-layered neural network having a special concatenation structure that is designed for voice processing, image processing, or the like.

However, this is merely exemplary, and the learning network model may be a learning network model based on various neural networks such as recurrent neural network (RNN), deep neural network (DNN), or the like.

In the meantime, the noise map may represent the quality of the input image. For example, the noise map includes information indicative of the quality of each pixel included in the input image. In this case, the size of the noise map may be equal to the size of the input image. For example, if the size of the input image is 4×4, the size of the noise map may also be 4×4. However, the embodiment is not limited thereto, and if the noise map represents the quality of the input image, the type, the display method of the information, or the like may use a number of ways. For example, the unit information of the noise map may correspond to an average value for each region of a predetermined size of the input image, rather than corresponding to each pixel value of the input image.

The memory 110 may further store a noise map generation model to obtain the noise map of the input image. Here, the noise map generation model may be a machine-learned model based on a plurality of sample images and a noise map for each sample image.

The learning network model and noise map generation model used to improve quality of the input image will be specified through the drawings.

The processor 120 is electrically connected to the memory 110 and controls overall operations of the electronic apparatus 100.

According to an embodiment, the processor 120 may include a digital signal processor (DSP) for processing a digital image signal, a microprocessor, a time controller (TCON), or the like, but is not limited thereto. The processor 120 may include, for example, and without limitation, one or more of a central processing unit (CPU), a micro controller unit (MCU), a micro processing unit (MPU), a controller, an application processor (AP), a communication processor (CP), an Advanced Reduced instruction set computing (RISC) Machine (ARM) processor, or the like, or may be defined as a corresponding term. The processor 120 may be implemented in a system on chip (SoC) type or a large scale integration (LSI) type which a processing algorithm is built therein or in a field programmable gate array (FPGA) type.

According to an embodiment, the processor 120 may obtain an output image in which quality of the input image is improved, by performing image-processing of the input image.

For instance, the processor 120 may obtain a noise map representing the quality of the input image from the input image, and obtain an output image in which quality of the input image is improved by applying the input image and the noise map to the learning network model including a plurality of layers. By using the noise map obtained from the input image in the process of improving the quality of the input image, the quality of the image is improved in an adaptive manner according to the type of the input image, and the overall effect of the quality improvement may be increased.

Here, the learning network model may be an artificial intelligence (AI) model which is obtained by learning, through an AI algorithm, a relationship among a plurality of sample images, a noise map for each sample image, and an original image corresponding to each sample image. Further, the plurality of layers of the learning network model may include an input layer, an intermediate layer, and an output layer. The input layer is a layer in which operation may be performed first among the plurality of layers, the output layer is a layer in which operation may be performed last, and the intermediate layer is a layer disposed between the input layer and the output layer.

According to an embodiment, processor 120 may provide a noise map to at least one intermediate layer among the plurality of layers. For example, the processor 120 may provide the noise map to each of the plurality of layers, or provide a noise map to each of the remaining layers other than the input layer among the plurality of layers. Through this operation, performance of quality improvement on an image may be improved since the quality of the image is continuously reflected in the process of the quality improvement of the input image.

For example, if the noise map is provided only to the input layer, among a plurality of layers, the noise map is not reflected while the image passes through the other layers, among the plurality of layers, the characteristic of the noise map may be weakened, and quality improvement performance may be degraded.

Alternatively, if the noise map is provided to only the output layer, among the plurality of layers, the noise map is not reflected while the image passes through the other layers, among the plurality of layers, and accordingly, quality improvement is performed in a state where the noise map is reflected only in the output layer. In general, the higher the number of layer in the learning network model, higher the performance image processing, and if the noise map is reflected only in the output layer, the overall performance of the image quality improvement may be degraded.

Therefore, when the processor 120 provides the noise map to at least one intermediate layer, quality improvement performance may be improved more than the case where the noise map is provided to only the input layer or the output layer.

The learning network model may further include at least one sub-layer, and the processor 120 may process the noise map using at least one sub-layer and provide the processed noise map to the at least one intermediate layer.

The processor 120 may provide a plurality of channels corresponding to the output data output from a previous layer of each of the at least one intermediate layer and additional channels to at least one intermediate layer, respectively. Here, the additional channel may be a processed noise map output from the sub-layer corresponding to each of the at least one intermediate layer. According to an embodiment, the processor 120 may not mix the output data output from the previous layer of each of the at least one intermediate layer with the processed noise map output from the sub-layer corresponding to each of the at least one intermediate layer, but concatenate the output data and the processed noise map in parallel, and provide to each of the at least one intermediate layer.

The processor 120 may provide the input image to the input layer among a plurality of layers included in the learning network model. In this case, the learning network model may be an AI model which is obtained by learning, through the AI algorithm, a relationship between an output image which is obtained by sequentially processing, by a plurality of layers, each of a plurality of sample images provided to the input layer among the plurality of layers and a noise map of each of the plurality of sample images provided to at least one intermediate layer with an original image corresponding to each of the plurality of sample images.

Alternatively, the processor 120 may provide an input image to the input layer, and may mix the output data of the output layer and the input image to obtain an output image. In other words, the processor 120 may provide the input image not only to the input layer but also a rear end of the output layer. In this case, the learning network model may be an AI model which is acquired by learning, through the AI algorithm, the relationship between an output image which is obtained by mixing an output data and each of a plurality of sample images, with an original image corresponding to each of the plurality of sample images, the output data which is obtained by sequentially processing, by a plurality of layers, each of a plurality of sample images provided to the input layer, among the plurality of layers, and a noise map of each of the plurality of sample images provided to at least one intermediate layer.

Here, each of a plurality of sample images may be a compressed image of an original image, and the noise map for each sample image may be a noise map obtained from each sample image and an original image corresponding to each sample image.

The processor 120 may obtain a noise map by applying the input image to a noise map generation model including a plurality of layers. Here, the noise map generation model may be an AI model obtained by learning a relationship between the plurality of sample images and a noise map for each of the plurality of sample images through an AI algorithm When learning a learning network model for improving the quality of an image and learning a noise map generation model, the same plurality of sample images and a noise map for each of the plurality of sample images may be used for learning both the learning network model and the noise map generation model. However, the embodiment is not limited thereto and, the learning data when learning a learning network model for improving the quality of an image and learning data when learning a noise map generation model may be different from each other.

The electronic apparatus 100 may further include a display. According to an embodiment, the electronic apparatus 100 may convert the resolution of the output image based on a resolution of the display, and control the display to display the image of which the resolution is converted. Here, the image with converted resolution may be a 4K ultra high definition (UHD) or 8K UHD image.

The processor 120 may apply each of the plurality of frames included in the video as an input image to a learning network model to obtain an output video with improved quality of the video. For example, the processor 120 may decode the video, apply each frame of the decoded video as an input image to a learning network model to improve quality, and combine frames with improved quality to obtain an output video with improved quality. Here, the processor 120 may obtain a noise map of each frame and use the obtained noise map in improving the quality of each frame.

As described above, the processor 120 may adaptively improve the quality of the input image, as the noise map is obtained from the input image. In addition, as the noise map is provided to at least one intermediate layer among the plurality of layers included in the learning network model, the processor 120 may perform the image processing while continuously reflecting the quality of the input image. Accordingly, the quality improvement performance of the input image may be improved.

Hereinbelow, the operation of the processor 120 will be further described through the drawings.

Figure 3A:
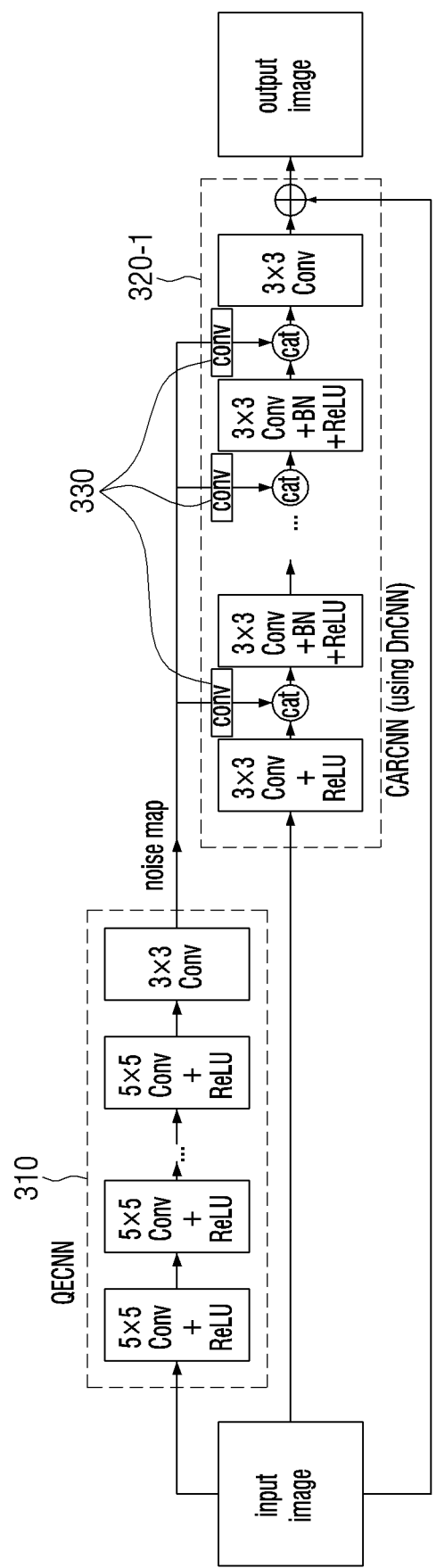
FIG. 3A is a view illustrating a learning network model and a noise map generation model according to various embodiments.
Figure 3B:
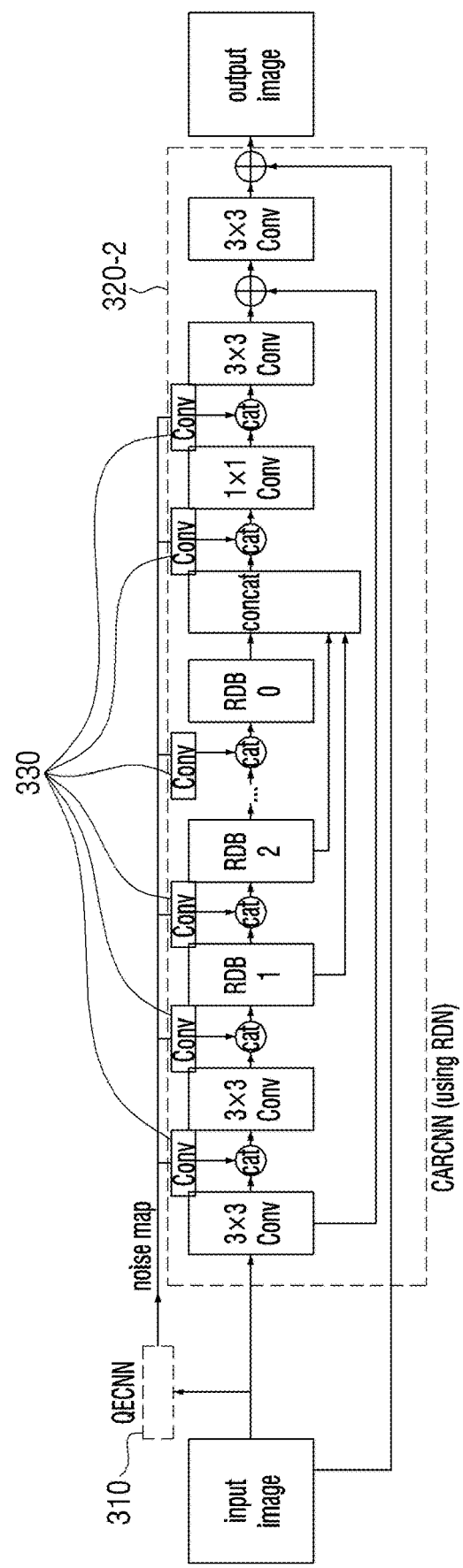
FIG. 3B is a view illustrating a learning network model and a noise map generation model according to various embodiments.

FIGS. 3A and 3B are views illustrating a learning network model and a noise map generation model according to various embodiments.

According to an embodiment in FIG. 3A, the processor 120 may obtain the noise map by applying the input image to a noise map generation model (quality estimation convolution neural network (QECNN)) 310.

The noise map generation model 310 may include a plurality of convolution layers. For example, each of the plurality of convolution layers may perform convolution on the input data using a kernel of 5×5. However, the embodiment is not limited thereto, and any other types of kernels may be used. Further, one convolutional layer may perform convolution on the input data using each of a plurality of kernels.

After the convolution is performed, some of the plurality of convolution layers may process the input data using a Rectified Linear Unit (ReLU) function. The ReLU function is a function of converting to zero if the input value is less than zero, and outputting the input value as it is if the input value is greater than zero. However, the embodiment is not limited thereto, and some of the plurality of convolution layers may process the input data using the sigmoid function.

The processor 120 may apply the input image to a learning network model (compression artifact reduction convolution neural network (CARCNN)) 320-1 to obtain an output image in which quality of the input image is improved. The processor 120 may provide the noise map to at least one intermediate layer among the plurality of layers. For example, the processor 120, as shown in FIG. 3A, may provide the noise map to each of the remaining layers except for an input layer, among the plurality of layers.

The learning network model 320-1 may include a plurality of convolution layers and a plurality of sub-convolution layers 330. For example, each of the plurality of convolution layers may perform convolution on the input data using a kernel of 3×3, and the plurality of sub-convolution layers 330 may perform a convolution on the noise map using a kernel of 1×1. However, the embodiment is not limited thereto, and any other types of kernels may be used. Further, one convolutional layer may perform convolution on the input data using each of a plurality of kernels.

Some of the plurality of convolution layers may process the input data using the ReLU function after performing convolution. Another portion of the plurality of convolution layers, after performing convolution, may process the input data using the batch normalization and the ReLU function. The batch normalization is a task that equalizes the distribution of each layer to ensure fast learning speed.

The output data output from the input layer, from among the plurality of convolution layers, may be divided into channels corresponding to the number of kernels included in the input layer. The output data output from the sub-convolution layer 330 corresponding to the input layer among the plurality of sub-convolution layers 330 may be concatenated to the output data output from the input layer and input to the next layer of the input layer. For example, output data composed of 36 channels in the input layer is output, output data composed of one channel is output from the sub-convolution layer 330 corresponding to the input layer, and output data comprised of a total of 37 channels may be input to the next layer of the input layer. The number of channels may vary according to the characteristics of each of the plurality of convolutional layers, and a similar operation is performed in the remaining convolution layers.

The processor 120 may obtain the output image having the quality of the input image is improved, by mixing the output data of the output layer, among a plurality of convolution layers, and the input image.

As described above, the processor 120 may obtain the noise map corresponding to the input image, and the performance of the image quality improvement processing may be improved, since the noise map is continuously reflected in the process of quality improvement process of the input image. For instance, the noise map is continuously reflected in the one or more of the intermediate layers of the processing operation of the de-noise convolution neural network (DnCNN).

The learning network model 320-1 of FIG. 3A illustrates that the plurality of sub-convolution layers 330 are added to continuously reflect the noise map to the de-noise convolution neural network (DnCNN), but as shown in FIG. 3B, a learning network model 320-2 may be configured to add the plurality of sub-convolution layers 330 for continuously reflecting the noise map to a residual dense network (RDN) format. A residual dense block (RDB) layer of FIG. 3B includes a plurality of convolution layers in a form in which a residual block and a dense block are combined, the output of each of the plurality of convolution layers may be sequentially input into the next convolutional layer and may be additionally input to a convolutional layer disposed at another location. The output data in which the initial input data of the RDB layer is mixed with the data which passes through the last layer may be output from the RDB layer. In the case of FIG. 3B, the same noise map generation model 310 as FIG. 3A may be used.

The embodiment is not limited thereto, and the learning network model 320-1 may use any basic model if the model may continuously reflect the noise map.

According to an embodiment, the models of FIGS. 3A and 3B may be implemented as software and stored in the memory 110, and the processor 120 may read out the data for performing an operation of each layer and perform processing for the input image.

Figure 4:
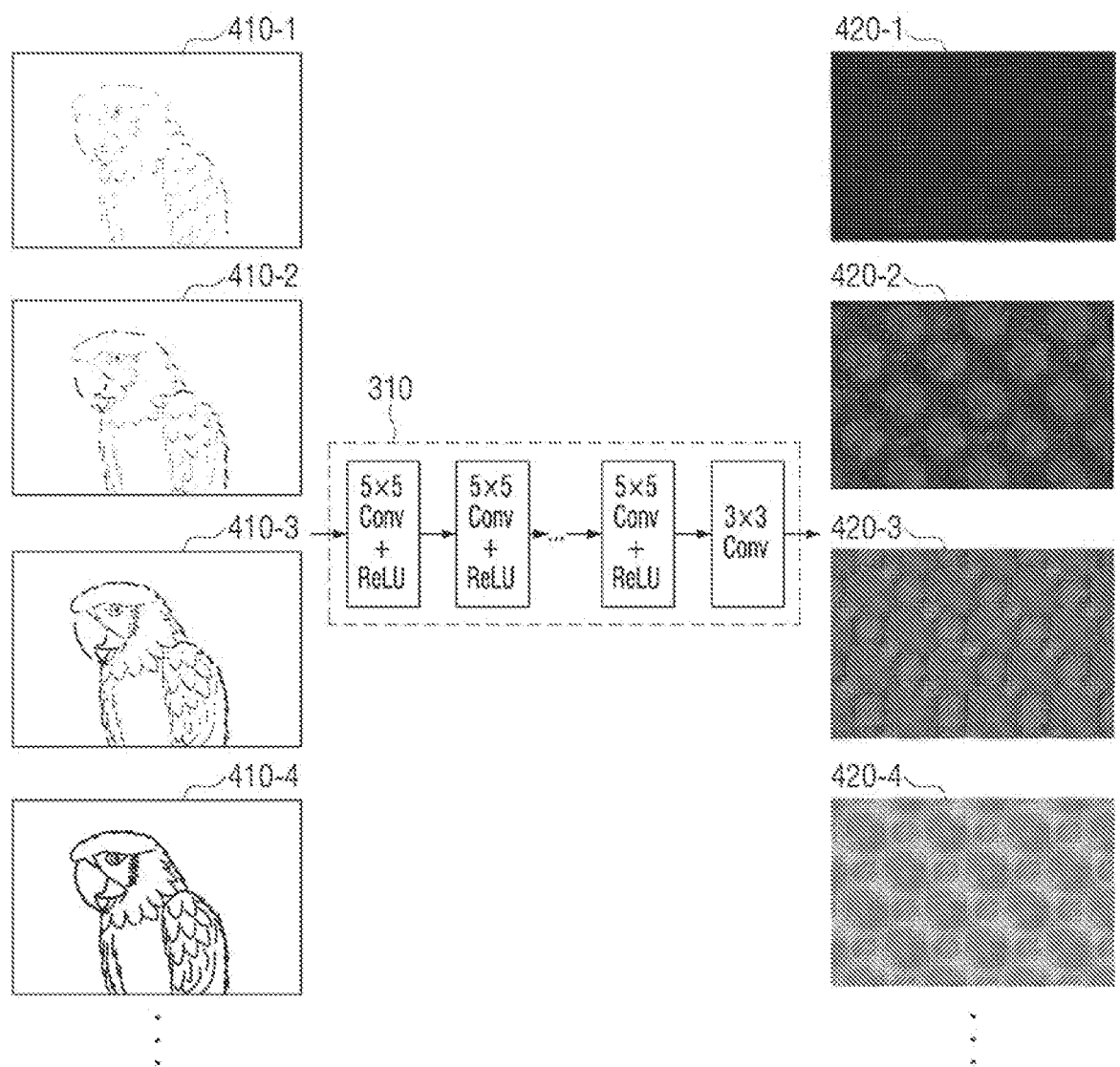
FIG. 4 is a view illustrating a learning method of the noise map generation model according to an embodiment.

FIG. 4 is a view illustrating a learning method of the noise map generation model according to an embodiment.

The noise map generation model may be an AI model obtained by learning a relationship between a plurality of sample images and a noise map for each of the plurality of sample images through an AI algorithm. For example, as shown in FIG. 4, the noise map generation model may learn, through the AI algorithm, the relationship between the output data according to an input of a first sample image 410-1 and a first noise map 420-1 of the first sample image 410-1. For the remaining pairs of data (410-2, 420-2) (410-3, 420-3), (410-4, 420-4), or the like, the same learning process may be repeated and the noise map generation model may be obtained. Here, the noise map for each sample image may be a noise map obtained through a predetermined algorithm of the rule base. For example, the first sample image 410-1 to the fourth sample image 410-4 may images of JPEG quality of 10, 30, 50, and 90, respectively, and the first noise map 420-1 to the fourth noise map 420-4 may be noise maps for the first sample image 410-1 to the fourth sample image 410-4, respectively.

The noise map generation model may be a model learned by another device, other than the electronic apparatus 100. The embodiment is not limited thereto, and the processor 120 of the electronic apparatus 100 may learn the noise map generation model.

Figure 5:
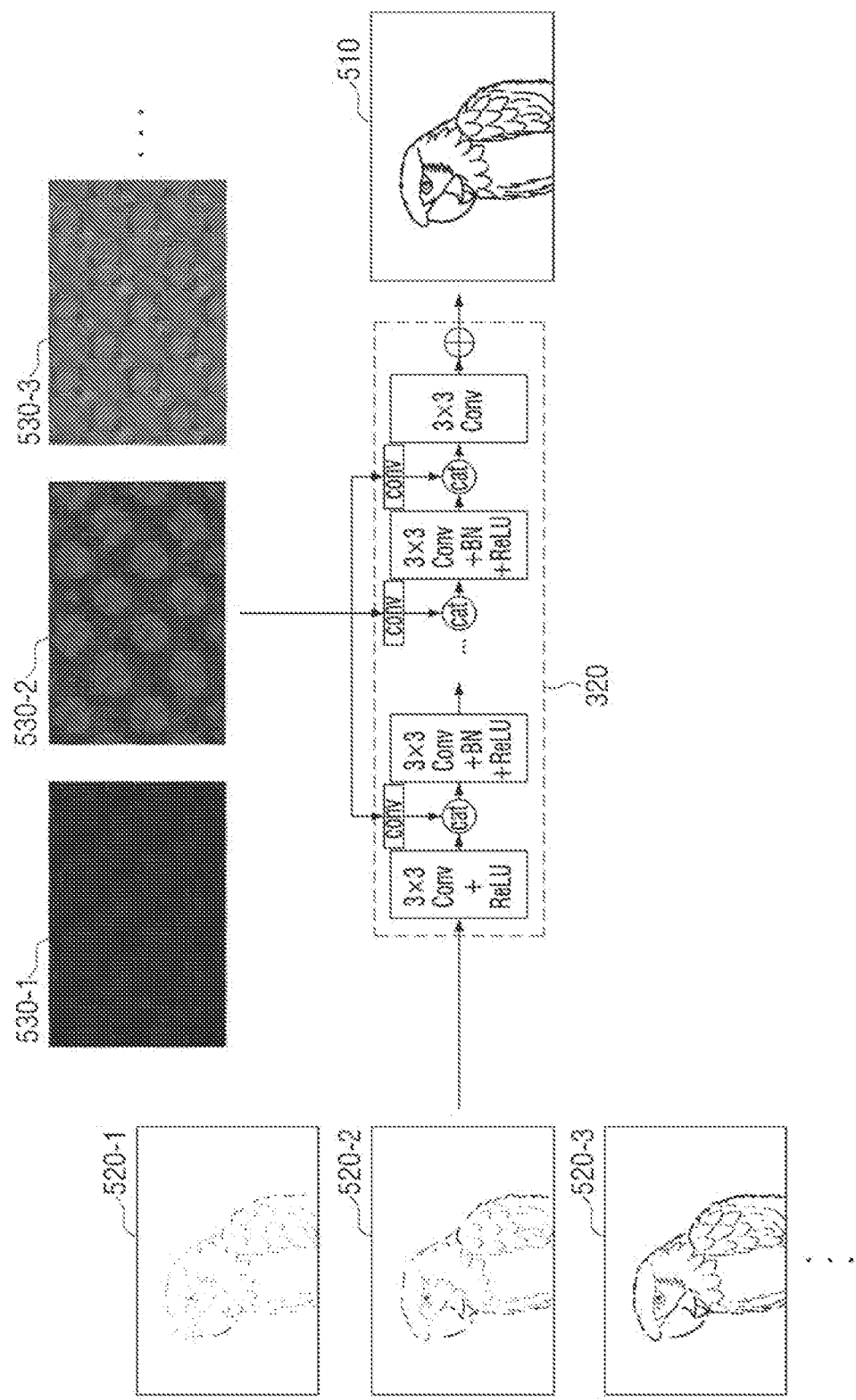
FIG. 5 is a view illustrating a learning method of a learning network model to improve quality of an image according to an embodiment.

FIG. 5 is a view illustrating a learning method of a learning network model to improve quality of an image according to an embodiment.

The learning method of the learning network model may be an AI model obtained by learning, through the AI algorithm, a relationship between a plurality of sample images, a noise map for each sample image, and an original image corresponding to each sample image. For example, as shown in FIG. 5, the learning network model may learn, through the AI algorithm, the relationship between the output data according to the input of the first sample image 520-1 and input of the first noise map 530-1 for the first sample image 520-1 and the original image 510 corresponding to the first sample image 520-1. For the relationship of the remaining data groups (520-2, 530-2, 510) and (520-3, 530-3, 510), the learning network model may be obtained by repeating the same learning process. Here, the noise map for each sample image may be a noise map obtained through a rule-based predetermined algorithm.

FIG. 5 illustrates that only one original image 510 is used, but in the real learning process, a plurality of original images may be used. That is, in addition to the original image 510 of FIG. 5, additional original images, a plurality of sample images which are obtained by compressing the additional original images with various compression rates, and noise maps for each sample image may be used in the learning process.

The learning network model may be a model that is learned by another apparatus, instead of the electronic apparatus 100. The embodiment is not limited thereto, and the processor 120 of the electronic apparatus 100 may learn the learning network model.

Figure 6:
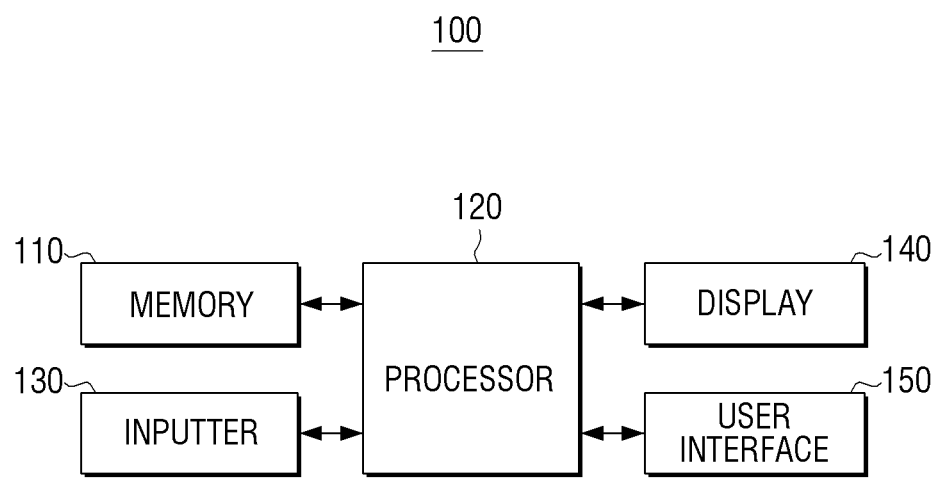
FIG. 6 is a block diagram illustrating a specific configuration of an electronic apparatus according to an embodiment.

FIG. 6 is a block diagram illustrating a specific configuration of an electronic apparatus 100 according to an embodiment.

Referring to FIG. 6, the electronic apparatus 100 may include a memory 110, a processor 120, an inputter 130, a display 140, and a user interface 150.

The memory 110 may store one or more instructions. The processor 120 may execute the one or more instructions stored in memory 110 to perform a noise map acquisition operation of the input image as described above, a quality improvement operation of the input image, a learning operation of each AI model, or the like. The configuration of FIG. 6 which are overlapped with the configurations of FIG. 2 will not be further described.

The inputter 130 receives various types of contents, such as image signals. For example, the inputter 130 may receive an image signal in a streaming or downloading manner from an external apparatus (for example, a source apparatus), an external storage medium (for example, universal serial bus (USB)), an external server (for example, a web hard), and the like through a communication method such as access point (AP)-based Wi-Fi (Wireless Lan network), Bluetooth, Zigbee, wired/wireless LAN, wide area network (WAN), Ethernet, IEEE1394, high definition multimedia interface (HDMI), mobile high definition link (MHL), universal serial bus (USB), display port (DP), Thunderbolt, video graphics array (VGA) port, RGB port, d-subminiature (D-SUB), digital visual interface (DVI), and the like. Here, the image signal may be a digital signal, but is not limited thereto. In addition, a video may be received through the inputter 130.

The display 140 may be implemented as various formats such as a liquid crystal display (LCD), an organic light-emitting diode (OLED), Light-Emitting Diode (LED), micro LED, Liquid Crystal on Silicon (LCoS), Digital Light Processing (DLP), quantum dot (QD) display panel, or the like.

The processor 120 may control the display 140 to display the output image in which quality of the input image is improved.

The user interface 150 may be implemented as a device such as a button, a touch pad, a mouse, a keyboard, a remote control receiver or a touch screen capable of performing the above-described display function and input function. The button may be various types of buttons such as a mechanical button, a touch pad, a wheel, and the like formed in an arbitrary area such as a front surface portion, a side surface portion, and a back surface portion of the main body of the electronic apparatus 100.

The processor 120 may perform quality improvement operation for the input image according to a user command input through the user interface 150.

Figure 7:
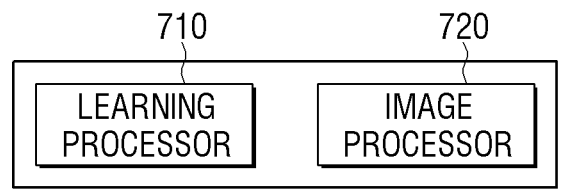
FIG. 7 is a block diagram illustrating a configuration of a processor for learning and using a learning network model according to an embodiment.

FIG. 7 is a block diagram illustrating a configuration of a processor 120 for learning and using a learning network model according to an embodiment. Learning and image processing may be performed by separate devices, but in FIG. 7, it is described for convenience of description that the electronic apparatus 100 learns the learning network model.

Referring to FIG. 7, the processor 120 may include at least one of a learning processor 710 or an image processor 720.

The learning processor 710 may generate or train a model for obtaining the noise map from the input image and a model for improving quality of the input image. The learning processor 710 may generate the recognition model having a determination criteria using the collected learning data.

For example, the learning processor 710 may generate, train, or update a model for obtaining a noise map from the input image using the input image and the noise map for the input image as learning data. In addition, the learning processor 710 may learn, train, or update a model for obtaining an original image from the input image and the noise map by using the input image, noise map for the input image, and an original image corresponding to the input image as learning data.

The image processor 720 may obtain the output data in which the quality of an input data is improved, by using the input data of the learning network model. According to an embodiment, the input data may be predetermined data.

For example, the image processor 720 may obtain the noise map of the input image and obtain the output image with improved quality of the input image based on the noise map.

According to an embodiment, at least a portion of the learning processor 710 and at least a portion of the image processor 720 may be implemented as software modules or at least one hardware chip form and mounted in the electronic apparatus 100. For example, at least one of the learning processor 710 and the image processor 720 may be manufactured in the form of an exclusive-use hardware chip for AI, or a conventional general purpose processor (e.g., a CPU or an application processor) or a graphics-only processor (e.g., a GPU) and may be mounted on various electronic devices described above or object recognition devices. Herein, the exclusive-use hardware chip for AI is a dedicated processor for probability calculation, and it has higher parallel processing performance than existing general purpose processor, so it can quickly process computation tasks in AI such as machine learning. When the learning processor 710 and the image processor 720 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an OS, and some of the software modules may be provided by a predetermined application.

In this case, the learning processor 710 and the image processor 720 may be mounted on one electronic apparatus, or may be mounted on separate servers, respectively. For example, one of the learning processor 710 and the image processor 720 may be included in the electronic apparatus 100, and the other one may be included in an external server. In addition, the learning processor 710 and the image processor 720 may provide the model information constructed by the learning processor 710 to the image processor 720 via wired or wireless communication, and provide data which is input to the image processor 720 to the learning processor 710 as additional data.

Figure 8A:
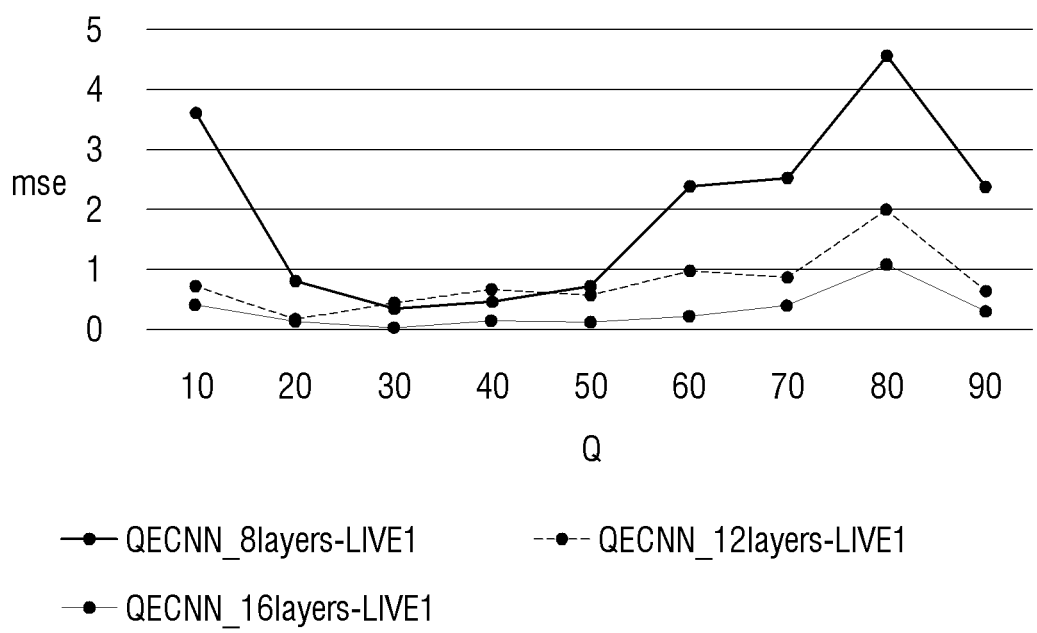
FIGS. 8A and 8B are views illustrating a performance of a noise map generation model according to various embodiments.
Figure 8B:
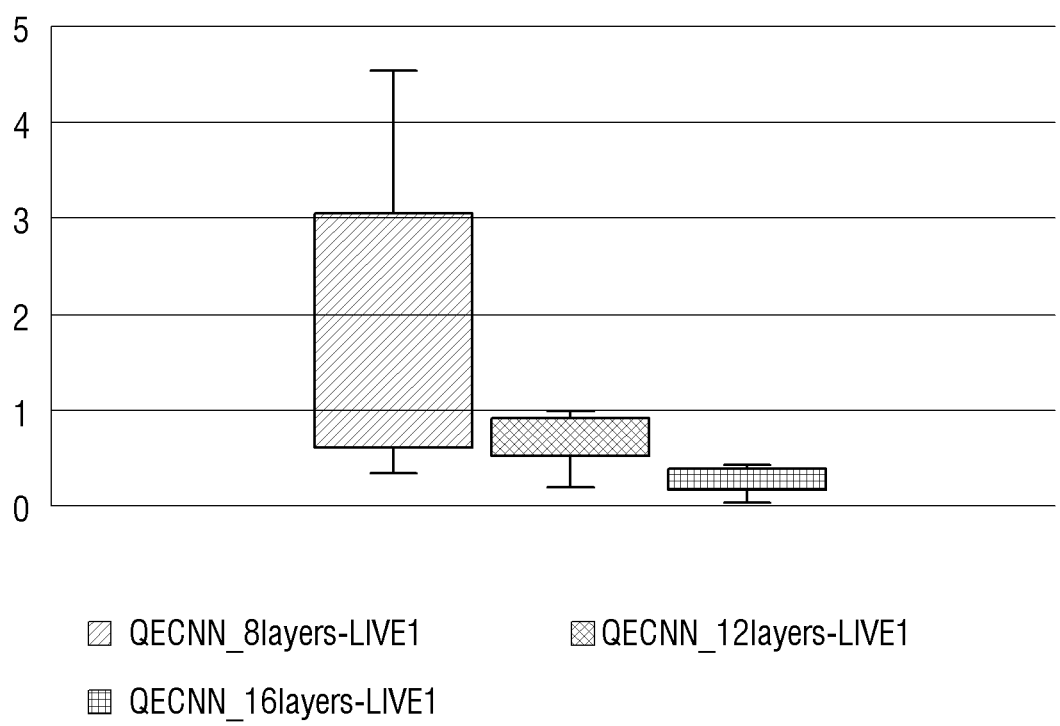

FIGS. 8A and 8B are views illustrating a performance of a noise map generation model according to various embodiments.

FIG. 8A illustrates a mean square error of a first noise map according to the quality of the image and a second noise map output from the noise map generation model using LIVE 1 video data set. For example, when an original image is compressed, the first noise map may be obtained from the compressed image through a predetermined algorithm of the rule based method, the second noise map may be obtained by applying the compressed image to the noise map generation model, and the mean square error of the first noise map and the second noise map may be obtained.

The compression factor (Q) of FIG. 8A represents quality in accordance with compression, and quality gets closer to the original image from 10 to 90. In addition, FIG. 8A depicts 8 layers, 12 layers, and 16 layers, and the more the layers, the lower the mean square error. This is more clearly illustrated in FIG. 8B.

When the number of layers is equal to or more than a particular number, the second noise map which is very similar to the first noise map is obtained, regardless of Q.

Figure 9B:
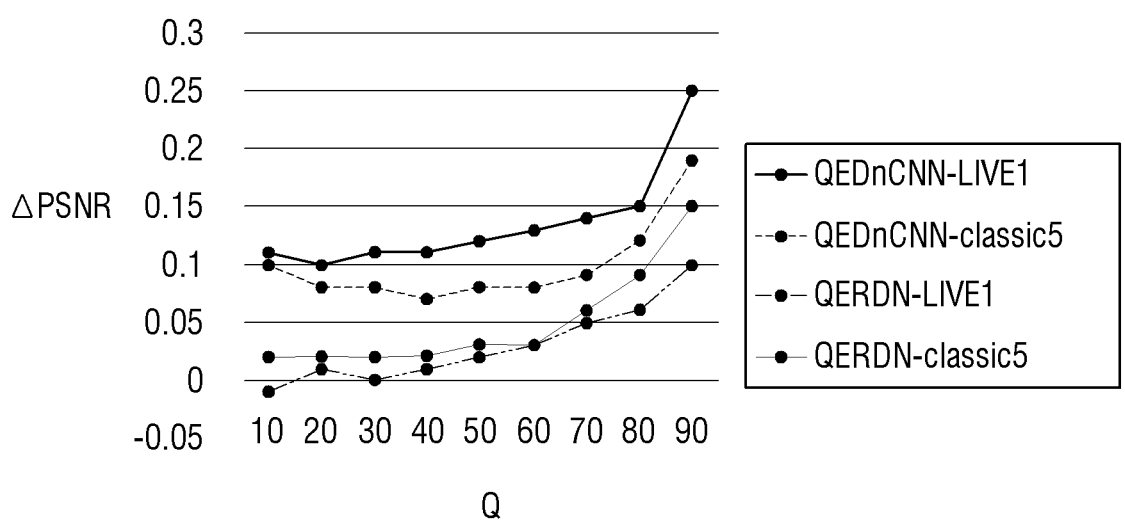

FIGS. 9A and 9B are views illustrating a performance of a learning network model to improve quality of an input image according to various embodiments.

FIG. 9A illustrates the average peak signal-to-noise ratio (PSNR)/structural similarity index (SSIM) results calculated after a compressed image of which Q is from 10 to 90 in the classic5 or LIVE1 video data set has been de-noised by various ways. The PSNR is maximum signal to noise ratio, representing the power of the noise for the maximum power, and the SSIM represents the similarity to the original image for distortion caused by compression and conversion as the structural similarity index.

As illustrated in FIG. 9A, the higher the Q, the higher the quality improvement function, and the performance of the QEDnCNN is improved more than the conventional DnCNN, and the performance of the QERDN is improved more than the conventional RDN.

In FIG. 9B, QEDnCNN and QERDN are compared, and it is seen that QEDnCNN has a better performance than QERDN, in general.

FIGS. 10A, 10B, 10C, and 10D are views illustrating various expanded examples of an embodiment.

Figure 10A:
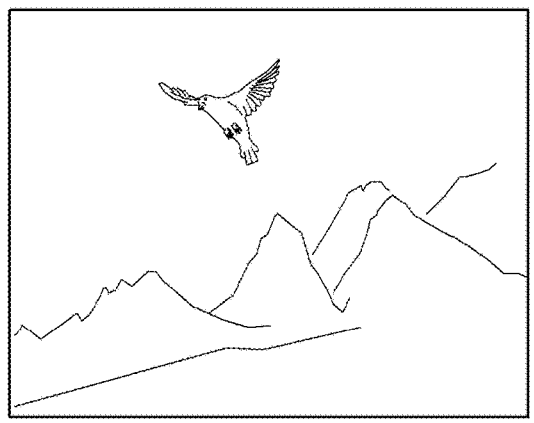
FIGS. 10A, 10B, 10C, and 10D are views illustrating various expanded examples.
Figure 10A:
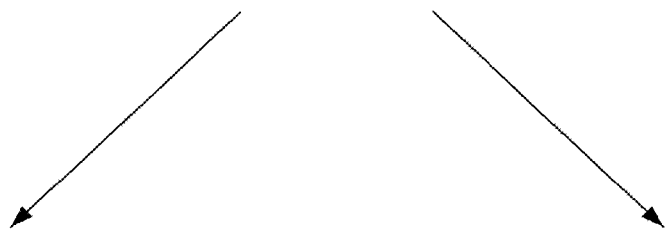
Figure 10A:
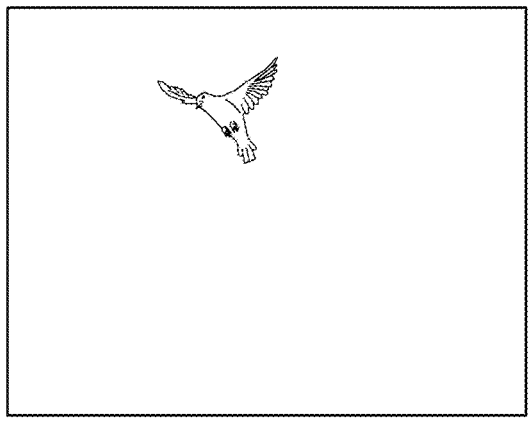
Figure 10A:
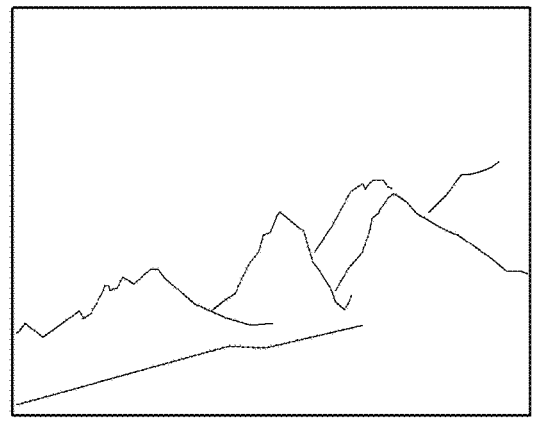

The processor 120 may divide the object region and the background region in the input image to improve the quality of the input image. For example, as shown in FIG. 10A, the processor 120 may obtain the output image with improved quality by dividing the original image into an object image including only an object and a background image that includes the remaining region except for the object, improving quality of each of the object image and the background image, and synthesizing the object image with improved quality and the background image with improved quality.

The processor 120 may identify an object region and a background region of the input image using various methods. For example, the processor 120 may identify an object with a particular shape in the input image based on a pixel value and identify a remaining region other than the region where the object is identified, as the background region. According to an embodiment, the shape may be a predetermined shape.

Alternatively, the processor 120 may identify an object with a particular shape using an AI model for object recognition and identify a remaining region except the region where the object is identified, as the background region.

The aforementioned embodiment is merely exemplary, and the processor 120 may identify the object region and the background region in the input image in many ways.

Figure 10B:
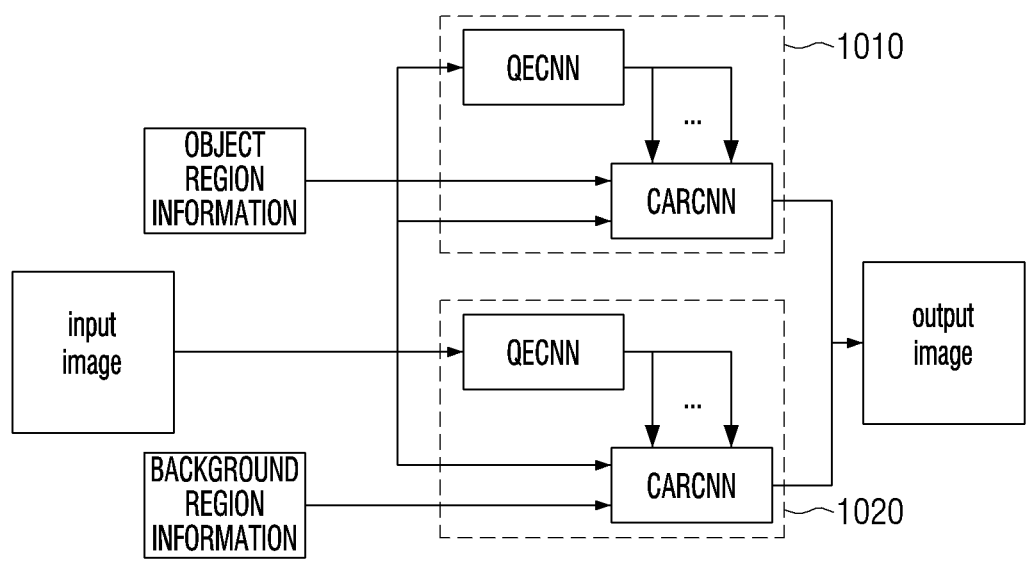

The processor 120 may perform image processing by dividing the object region and the background region using a plurality of image quality improvement models. For example, the processor 120, as illustrated in FIG. 10B, may improve quality of the object region in the input image by applying the input image and the object region information in the input image to a first image quality improvement model 1010 and improve quality of the background region in the input image by applying the input image and the background region information in the input image to a second image quality improvement model 1020. The processor 120 may combine the object region with improved quality and the background region with improved quality and obtain the output image with improved quality.

Here, the object region information may include information corresponding to the lower left drawing in FIG. 10A, and the background region information may include information corresponding to the lower right drawing in FIG. 10A. According to an embodiment, the object region information may include pixels values of the image in the lower left drawing in FIG. 10A, and the background region information may include pixels values of the image in the lower right drawing in FIG. 10A. Alternatively, the object region information and the background region information may not include pixel values, and may include only region information to distinguish between the object region and the background region. For example, the object region information may be an image that indicates the object region as 1, and indicates the background region as 0, and the background region information may be an image that indicates the background region as 1, and the object region as 0.

The first image quality improvement model 1010 may include the first noise map generation model to obtain the noise map from the input image and the first learning network model to improve quality of the object region of the input image. The second image quality improvement model 1020 may include the second noise map generation model to obtain the noise map from the input image and the second learning network model to improve the quality of the background region of the input image.

The first noise map generation model may be a model for generating the noise map of the object region, and the second noise map generation model may be a model for generating the noise map of the background region.

The first learning network model may be a model for improving image quality of the object region, and the second learning network model may be a model for improving image quality of the background region. According to an embodiment, for the first learning network model and the second learning network model, different sample images may be used during a learning process. For example, the first learning network model may be generated by learning the original image and an upscaled image after lowering the resolution of the original image, and the second learning network model may be generated by learning the original image and an image that adds noise to the original image. In this case, the processor 120 may obtain a sharp resultant output as if resolution of the object region is improved by using the first learning network model, and obtain a resultant output in which background region is de-noised using the second learning network model. The processor 120 may perform different image processing on the object region and the background region through the ways described above.

In FIG. 10B, it has been described that only an input image is applied to the first noise map generation model and the second noise map generation model, but this is not limited thereto. For example, not only the input image but also the object region information may be additionally applied to the first noise map generation model, and not only the input image but also the background region information may be additionally applied to the second noise map generation model.

Figure 10C:
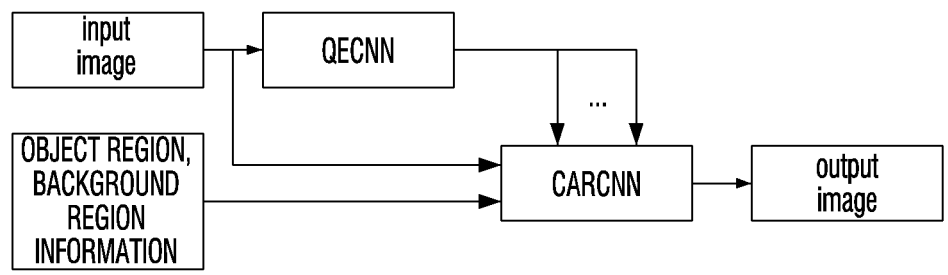

Alternatively, the processor 120 may perform image processing by dividing the object region and the background region using one image quality improvement model. For example, the processor 120, as illustrated in FIG. 10C, may obtain the output image with improved quality of the input image by additionally applying not only the input image and the noise map but also at least one of the object region information or the background region information to the learning network model (CARCNN).

The object region information and the background region information may be the same as FIG. 10B. Alternatively, one image in which the object region is represented as 1, and the background region is represented as 0, as the object region information and the background region information, may be used. However, the embodiment is not limited thereto, and any method which may divide the object region and the background region may be used.

The learning network model may be a model learned to correspond to types of the object region information and the background region information. For example, when an image in which the object region is represented as 1, and the background region is represented as 0 is used, the same type of image may be used in the learning process.

In addition, the plurality of sample images used in the learning process of the learning network model may also be different sample images in terms of the object region and the quality improvement scheme of the background region. For example, an object region of a plurality of sample images may be a region with improved quality to a higher level than the background region. Here, the plurality of sample images may be obtained through degradation of the original image. That is, the plurality of sample images may be obtained through a method in which an object region and a background region of the original image are degraded to different levels. Alternatively, each of the plurality of sample images may be a compressed image in which the object region and the background region of the corresponding original image are compressed in a different manner.

That is, the learning network model of FIG. 10C may perform quality improvement by identifying the object region and the background region of the input image, and dividing the object region and the background region.

In FIG. 10C, the image quality improvement model includes a noise map generation model (QECNN) and a learning network model, wherein only the input image is applied to the noise map generation model, but is not limited thereto. For example, the processor 120 may further apply at not only the input image but also at least one of the object region information or the background region information to the noise map generation model and obtain a noise map for the input image.

Figure 10D:
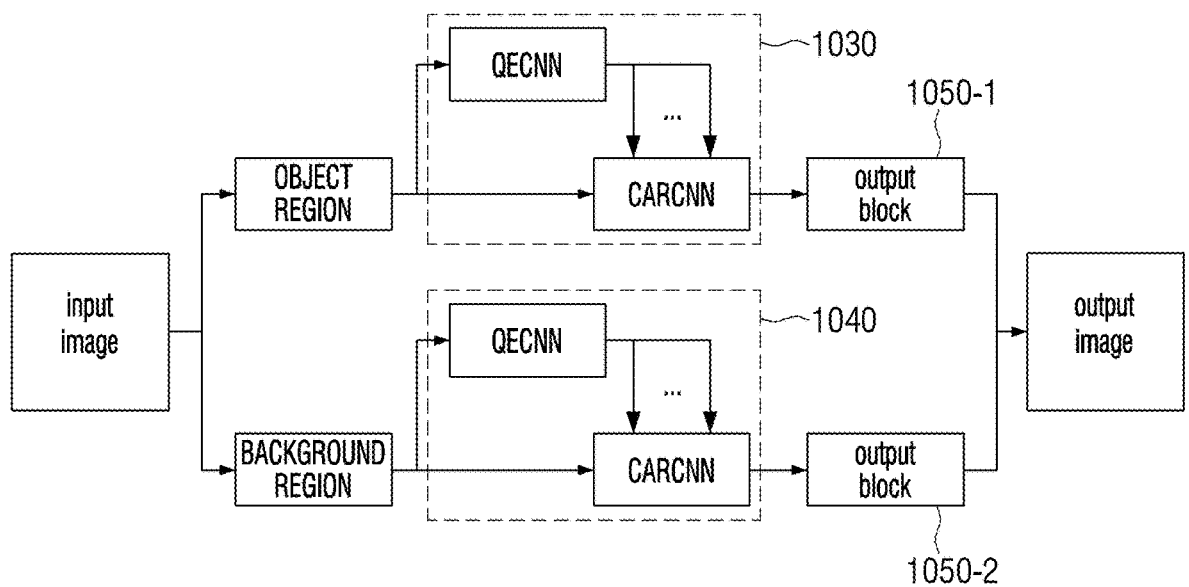

Alternatively, the processor 120 may divide the input image into a plurality of blocks, divide each block into an object region and a background region, and process the object region and the background region through a separate AI model. For example, as illustrated in FIG. 10D, the processor 120 may sequentially divide the input image into blocks of a predetermined size, and identify whether each block is an object region or a background region. The processor 120 may obtain a first output block 1050-1 by applying the block identified as the object region to the first image quality improvement model 1030, obtain a second output block 1050-2 by applying the block identified as the background region to the second image quality improvement model 1040, and obtain an output image by incorporating the first output block 1050-1 and the second output block 1050-2.

Here, in the learning process of the first image quality improvement model 1030, a plurality of sample blocks representing the object region may be used, and in the learning process of the second image quality improvement model 1040, a plurality of sample blocks representing the background region may be used.

As described above, the processor 120 may divide the object region and the background region in the input image and improve quality of the input image.

Figure 11:
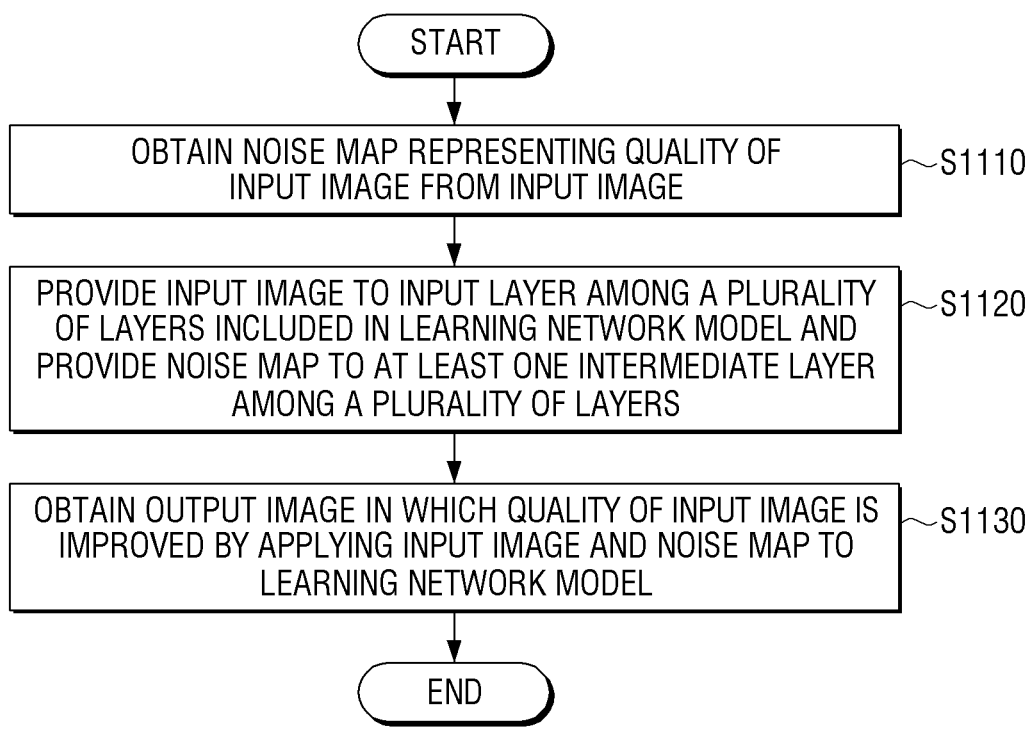
FIG. 11 is a flowchart illustrating an image processing method of an electronic apparatus according to an embodiment.

FIG. 11 is a flowchart illustrating an image processing method of the electronic apparatus according to an embodiment.

In operation S1110, the noise map representing the quality of the input image is obtained from the input image. In operation S1120, the input image is provided to an input layer among a plurality of layers included in the learning network model, and the noise map is provided to at least one intermediate layer among the plurality of layers. In operation S1130, the output image with the improved input image quality is obtained by applying the input image and the noise map to the learning network model. Here, the learning network model may be the AI model which is obtained by learning the relationship among a plurality of sample images, a noise map for each sample image, and an original image corresponding to each sample image through the AI algorithm.

Here, the learning network model may further include at least one sub-layer, and operation S1120 may further include processing the noise map using at least one sub-layer and provide the processed noise map to at least one intermediate layer.

According to an embodiment, operation S1120 may further provide, to each of the at least one intermediate layer, a plurality of channels and additional channels corresponding to output data output from the previous layer of each of the at least one intermediate layer, and the additional channel may be a processed noise map output from the sub-layer corresponding to each of the at least one intermediate layer.

According to an embodiment, operation S1130 may further mix the output data of the output layer, among a plurality of layers, and the input image and obtain the output image.

According to an embodiment, operation S1110 may further obtain the noise map by applying the input image to the noise map generation model including a plurality of layers, and the noise map generation model may be an AI model which is obtained by learning the relationship between the plurality of sample images and the noise map for each sample image.

According to an embodiment, operation S1120 may further provide the noise map to each of the plurality of layers, or provide the noise map to each of the remaining layers except the input layer, among a plurality of layers.

The learning network model may be the AI model which is obtained by learning, through an AI algorithm, a relationship between an output image which is obtained by learning, through the AI algorithm, a relationship between an output image which is obtained by sequentially processing, by a plurality of layers, each of a plurality of sample images provided to the input layer among the plurality of layers and a noise map of each of the plurality of sample images provided to at least one intermediate layer with an original image corresponding to each of the plurality of sample images.

Each of the plurality of sample images may be a compressed image in which the original image is compressed, and the noise map for each sample image may be a noise map obtained from each sample image and the original image corresponding to each sample image.

According to an embodiment, operation S1130 may further obtain an output video with improved quality by applying each of a plurality of frames included in the video to the learning network model as the input image.

According to an embodiment, the method illustrated in FIG. 11 may further include converting the resolution of the output image based on the resolution of the display of the electronic device and displaying the image with converted resolution, and the image with converted resolution may be a 4K UHD image or an 8K UHD image.

According to an embodiment, an electronic apparatus having a memory storing one or more instructions and a processor, electrically connected to the memory, and configured to execute the one or more instructions is provided. According to an embodiment, the processor may obtain a first region from an input image, adjust a feature in the first region of the input image based on a relationship between information about the first region and at least one of a plurality of candidate images and obtain an output image based on the adjusted first region and the input image.

The plurality of candidate images may be obtained by providing one or more original images to a learning network model, the learning network model being an artificial intelligence (AI) model that is obtained by learning, through an AI algorithm, a relationship between a plurality of sample images corresponding to the one or more original images, a respective noise map of each of the plurality of sample images, and the one or more original images.

According to an embodiment, adjusting the feature in the first region of the input image may include upscaling the resolution of the first region of the input image based on the at least one of the plurality of candidate images. The plurality of candidate images may be obtained based on an original image and an up-scaled image, which is obtained after lowering the resolution of the original image.

According to an embodiment, adjusting the feature in the first region of the input image comprises de-noising the first region of the input image based on the at least one of the plurality of candidate images. The plurality of candidate images are obtained based on an original image and a noisy image, which is obtained after adding noise to the original image.

According to an embodiment, an electronic apparatus having a memory storing one or more instructions and a processor, electrically connected to the memory, and configured to execute the one or more instructions is provided. According to an embodiment, the processor may obtain a first object from an input image, the first object being different from a second object in the input image, individually adjust a feature in the first object of the input image by processing the first object separate from the second object in the input image; and obtain an output image based on the adjusted first object and the input image.

The processing the first object may include processing the first object based on a learning network model, the learning network model being an artificial intelligence (AI) model that is obtained by learning, through an AI algorithm, a relationship between a plurality of sample images corresponding to one or more original images, a respective noise map of each of the plurality of sample images, and the one or more original images.

The adjusting the feature in the first object of the input image may include adjusting the resolution of the first object of the input image based on a relationship between information about the first object and at least one of a plurality of candidate images obtained by training the learning network model.

The plurality of candidate images may be obtained based on an original image and an upscaled image, which is obtained after lowering the resolution of the original image.

The adjusting the feature in the first object of the input image may include de-noising the first object of the input image based on a relationship between information about the first object and at least one of a plurality of candidate images by training the learning network model.

The plurality of candidate images may be obtained based on an original image and a noisy image, which is obtained after adding noise to the original image.

According to various embodiments of the disclosure, the electronic apparatus may identify quality of the input image more accurately by obtaining the noise map from the input image, and improve quality of the input image using the learning network model which operates adaptively based on the noise map. That is, the electronic apparatus may obtain the noise map from the input image for de-noising, and thus may have an excellent de-noising effect for a spatially varying image, and may reduce the compression artifacts.

According to the disclosure of the disclosure, various example embodiments as described above may be implemented with software including instructions stored in the machine-readable storage media readable by a machine (e.g., computer). According to one or more embodiments, an apparatus may call instructions from the storage medium and operate according to the called instructions. When an instruction is executed by a processor, the processor may perform functions corresponding to the instruction, either directly or under the control of the processor, using other components. The instructions may include a code generated by a compiler or executed by an interpreter. A machine-readable storage medium may be provided in the form of a non-transitory storage medium.

According to one or more embodiments of the disclosure, a method may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

In addition, one or more embodiments of the disclosure described above may be implemented in a computer readable medium, such as a computer or similar device, using software, hardware, or combination thereof. In some cases, the one or more embodiments described herein may be implemented by the processor itself. According to a software implementation, embodiments such as the procedures and functions described herein may be implemented with separate software modules. Each of the software modules may perform one or more of the functions and operations descried herein.

According to one or more embodiments of the disclosure, computer instructions for performing the processing operations of the apparatus may be stored in a non-transitory computer-readable medium. The computer instructions stored in the non-transitory computer-readable medium may cause a particular apparatus to perform the processing operations on the apparatus according to the one or more embodiments described above when executed by the processor of the particular apparatus. Non-transitory computer readable medium is a medium that semi-permanently stores data and is readable by the apparatus. Examples of non-transitory computer-readable media include CD, DVD, hard disk, Blu-ray disk, USB, memory card, ROM, or the like.

Each of the elements (for example, a module or a program) according to one or more embodiments may be comprised of a single entity or a plurality of entities, and some sub-elements of the abovementioned sub-elements may be omitted, the elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While various embodiments have been illustrated and described with reference to certain drawings, the disclosure is not limited to specific embodiments or the drawings, and it will be understood by those of ordinary skill in the art that various changes in form and details may be made therein without departing from the spirit and scope as defined, for example, by the following claims and their equivalents.

What is claimed is:

1. An electronic apparatus comprising:
    a memory storing one or more instructions; and
    a processor, electrically connected to the memory, and configured to execute the one or more instructions to:
        obtain, from an input image, a noise map corresponding to the input image;
        provide the input image to an input layer of a learning network model including a plurality of layers, the learning network model being an artificial intelligence (AI) model that is obtained by learning, through an AI algorithm, a relationship between a plurality of sample images, a respective noise map of each of the plurality of sample images, and an original image corresponding to the plurality of sample images;

provide the noise map directly to a plurality of intermediate layers, among the plurality of layers; and obtain an output image based on a result from providing the input image and the noise map to the learning network model, wherein the processor is further configured to:
divide the input image into an object region and a background region;
apply the input image and the object region information to a first image quality improvement model; and
apply the input image and the background region information to a second image quality improvement model.

2. The electronic apparatus of claim 1,
wherein the learning network model further comprises at least one sub-layer, and
wherein the processor is further configured to process the noise map using the at least one sub-layer, and provide the processed noise map to the plurality of intermediate layers.

3. The electronic apparatus of claim 2,
wherein the processor is further configured to provide a plurality of channels corresponding to output data that is output from a previous layer of each of the plurality of intermediate layers and an additional channel to each of the plurality of intermediate layers, and
wherein the additional channel is the processed noise map that is output from a sub-layer, among the at least one sub-layer, corresponding to each of the plurality of intermediate layers.

4. The electronic apparatus of claim 1,
wherein the processor is further configured to obtain the output image by mixing the input image and output data of an output layer among the plurality of layers.

5. The electronic apparatus of claim 1,
wherein the processor is further configured to obtain the noise map by providing the input image to a noise map generation model including a plurality of layers, and
wherein the noise map generation model is an AI model that is obtained by learning, through an AI algorithm, a relationship between the plurality of sample images and a respective noise map of each of the plurality of sample images.

6. The electronic apparatus of claim 1,
wherein the processor is further configured to provide the noise map to each of the plurality of layers or provide the noise map to each of remaining layers except the input layer among the plurality of layers.

7. The electronic apparatus of claim 1,
wherein the learning network model is an AI model obtained by learning, through the AI algorithm, a relationship between an output image that is obtained by sequentially processing, by the plurality of layers, each of the plurality of sample images provided to an input layer, among the plurality of layers, and a respective noise map of each of the plurality of sample images provided to the plurality of intermediate layers and an original image corresponding to each of the plurality of sample images.

8. The electronic apparatus of claim 1,
wherein each of the plurality of sample images is a compression image in which an original image is compressed, and
wherein the noise map for the respective sample images is a noise map obtained from the respective sample images and an original image corresponding to the respective sample images.

9. The electronic apparatus of claim 1,
wherein the processor is further configured to obtain an output video in which a feature of the video is adjusted, by providing each of a plurality of frames included in the video to the learning network model as the input image.

10. The electronic apparatus of claim 1, further comprising:
a display,
wherein the processor is further configured to:
convert a resolution of the output image based on the resolution of the display and control the display to display the output image with converted resolution, and
wherein the output image with converted resolution is a 4K ultra high definition (UHD) image or an 8K UHD image.

11. The electronic apparatus of claim 1, wherein the processor is further configured to:
obtain the object region from the input image;
adjust a feature of the object region by providing information on the object region to the learning network model, and
obtain the output image based on the feature of the object region adjusted.

12. The electronic apparatus of claim 11,
wherein the learning network model is a model for upscaling a resolution of an image.

13. The electronic apparatus of claim 11, wherein the learning network model is a model for de-noising an image.

14. The electronic apparatus of claim 1, wherein the processor is further configured to:
obtain the background region from the input image;
adjust a feature of the background region by providing information on the background region to the learning network model, and
obtain the output image based on the feature of the background region adjusted.

15. The electronic apparatus of claim 1, wherein the processor is further configured to:
obtain the object region and the background region from the input image, and
obtain the output image in which a feature of the input image is adjusted by providing at least one of information on the object region or information on the background region to the learning network model.

16. An image processing method of an electronic apparatus, the method comprising:
obtaining, from an input image, a noise map corresponding to the input image;
providing an input image to an input layer among a plurality of layers included in a learning network model, the learning network model being an artificial intelligence (AI) model that is obtained by learning, through an AI algorithm, a relationship between a plurality of sample images, a respective noise map of each of the plurality of sample images, and an original image corresponding to the plurality of sample images;
providing the noise map directly to a plurality of intermediate layer, among the plurality of layers; and obtaining an output image based on a result from providing the input image and the noise map to the learning network model, wherein the method further comprises:
dividing the input image into an object region and a background region;
applying the input image and the object region information to a first image quality improvement model; and
applying the input image and the background region information to a second image quality improvement model.

17. The method of claim 16, further comprising:
processing the noise map using at least one sub-layer of the learning network model; and
providing the processed noise map to the plurality of intermediate layers.

18. The method of claim 17,
wherein the providing the noise map to the plurality of intermediate layers comprises providing a plurality of channels corresponding to output data that is output from a previous layer of each of the plurality of intermediate layers and an additional channel to each of the plurality of intermediate layers, and
wherein the additional channel is the processed noise map that is output from a sub-layer, among the at least one sub-layer, corresponding to each of the plurality of intermediate layers.

19. The method of claim 16,
wherein the obtaining the output image comprises obtaining the output image by mixing the input image and output data of an output layer among the plurality of layers.

20. The method of claim 16,
wherein the obtaining the noise map comprises obtaining the noise map by applying the input image to a noise map generation model including a plurality of layers, and
wherein the noise map generation model is an AI model that is obtained by learning, through an AI algorithm, a relationship between the plurality of sample images and a respective noise map of each of the plurality of sample images.

* * * * *